E. S. Rice.
Harrow and Cultivator.
No. 88,740. Patented Apr. 6, 1869.

Witnesses
J. Y. Colby.
K. H. Marsh

Inventor.
E. S. Rice.
pr. D. C. Calley & Son
Attorneys

E. S. RICE, OF PAW PAW, MICHIGAN.

Letters Patent No. 88,740, dated April 6, 1869.

IMPROVEMENT IN HARROW AND CULTIVATOR.

The Schedule referred to in these Letters Patent and making part of the same.

*To whom it may concern:*

Be it known that I, E. S. RICE, of Paw Paw, in the county of Van Buren, and State of Michigan, have, as I believe, invented new and useful Improvements in a Farm Implement to be used as both Harrow and Cultivator; and I do hereby declare the following to be a full and exact description of the same, reference being had to the drawings that accompany and form a part of these specifications.

Figure 3:
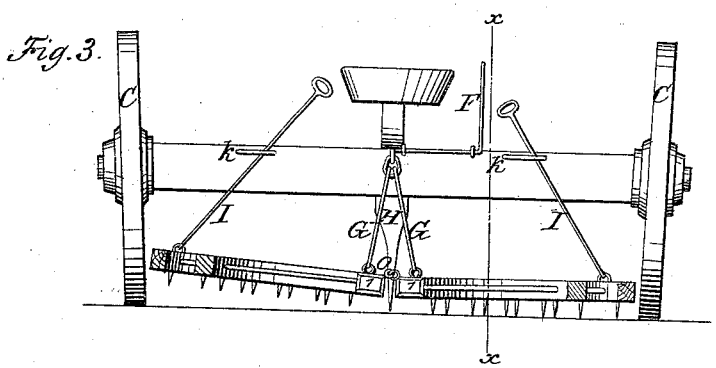

Figure 3, a section on a line just in the rear of the axle.

A represents the main frame of the harrow, composed of the two longitudinal, parallel beams 1 1, the two front wings 2 2, and the rear ones, 3 3.

B, an axle, with a pole. To these two the frame A is suspended, or attached.

Figure 1:
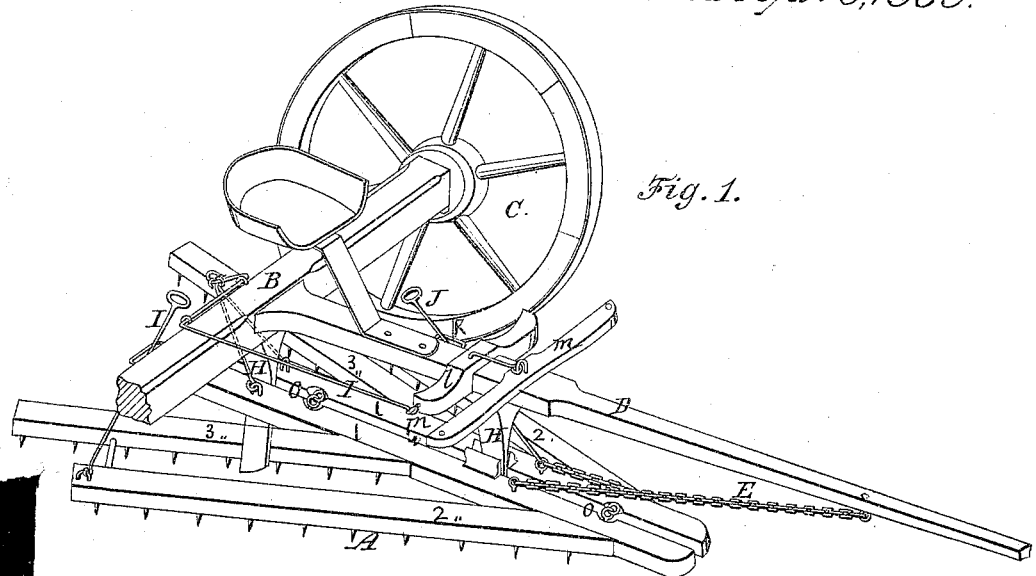
Figure 1 is a perspective view, with one of the wheels removed, and the general frame of the harrow raised beneath the axle, as when going to or returning from the field.

C, the wheels, and in height, should be sufficient to allow of raising the frame A, as in fig. 1.

D, the pole, to which the draught-chain is attached. (See figs. 1 and 2.)

E, the draught-chain, divided into two branches toward its rear end, one of which attaches to one of the beams 1, the other to the other of the beams 1.

F, lever, for raising and lowering the frame A, its operation more fully explained hereinafter.

G, two rods, their upper ends attached to the short arm of the lever F, the other ends, one to each of the bars 1 1. (See fig. 3.)

H, two guide-bars, firmly fixed, the rear one in the centre of the axle B, the other in the pole D, extending downward and passing between the centre-beams 1 1, they enter the soil, and serve to keep the harrow-frame A steady, or from too much lateral movement, even to striking against the wheels.

I, two rods, the lower ends attached to the bars 2 2, and extending within reach of the driver, on his seat. By these, either side of the frame A may be raised, to clear it of obstructions. (See fig. 3.)

J, another rod, by which the operator may raise the front of the frame A, when a stone or other hindrance renders it requisite. (See fig. 1.)

k, staples, to keep the rods I and J in position.

l, a short cross-bar, on the pole D.

m, evener, to which the whiffle-trees are attached.

n, a hook, in one end of the cross-bar l, to retain the long arm of the lever F, when in position, shown in fig. 3.

O O, the hinges, by which the beams 1 1 are united. (See figs. 1 and 3.)

My invention relates to the following particulars:

First, the raising of the frame A, for transportation, or other purposes.

Second, guiding or steadying the frame, to prevent sudden side-movement against the wheels or the horses.

Third, raising the sides of the frame, to relieve them of obstructions.

The first of these, I secure by means of the draught-chain E, the two rods G, and the lever F.

It will be noticed, that the point of attaching the rods G to the beams 1 and 1, is much in advance of the point of attaching them by their other ends to the short arm of the lever F.

Now, suppose the lever F, as in fig. 1, and the driver in his seat, he stoops forward, releases the lever F from the hook n, and lets the frame of the harrow down to the ground.

To raise it, the operator seizes the long arm of the lever F with his right hand, and carries it forward and downward, until it may be held by the hook n.

The draw-chain E being always straightened, and, as before mentioned, the lower ends of the rods G in advance of their upper ends, as the long arm of the lever F is carried forward and downward, the short arm will be carried backward and upward, and the frame A consequently carried backward and upward, bodily, front end as well as rear, into position denoted in fig. 1.

Figure 2:
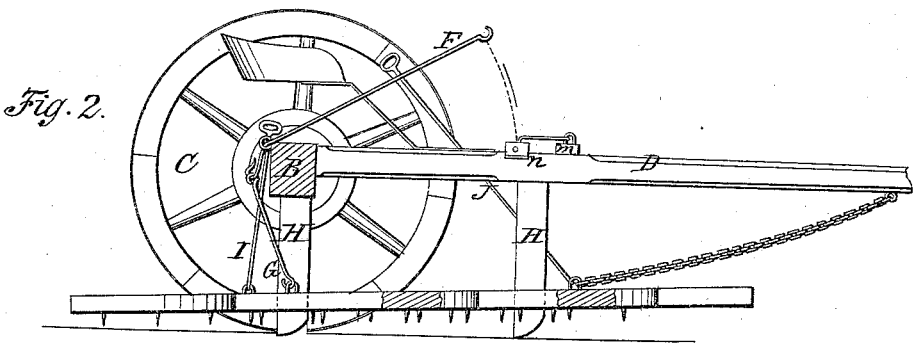
Figure 2 is a longitudinal bisection, presenting the harrow just dropping to the soil.

To cause the steadying-bars H to prove effectual, they should enter well into the soil, and present a wide, space-like surface, laterally to the soil, while the front edge should be formed as represented in fig. 2, that it may override any unyielding obstruction.

If found necessary, these guides may be arranged, so as to be taken up or let down, to suit attendant circumstances.

When the operator, in his seat, perceives any undue obstructions on either side or front part of the frame A, he has only to take hold of the rod I, at his right or left, or the rod J, in front, as the case may be, and raise it, allowing the gathered weeds, turf, or whatever the obstruction is, to fall off the teeth, then let that part of the frame drop to its work again.

I would apply this same arrangement to cultivate growing crops.

If rows were to be near together, I would make the side bars 2 and 2, and 3 and 3, very short; make the evener much longer, and let the horses pass astride two rows at once.

Such an arrangement enables a farmer to have a good harrow for preparing his soil, and a good and effective cultivator in one and the same implement.

What I claim as of my invention, and desire to secure by Letters Patent, is—

1. The lever F, the rods G, the frame A, and draught-chain E, arranged and combined substantially as and for the purposes specified.

2. The guide-bars H, in combination with the axle B, pole D, and bars 1 and 1, substantially as and to operate for the purpose set forth.

3. The rods I and J, in combination with the frame A, and the axle B, and pole D, and arranged in relation to the operator's or driver's seat, substantially as illustrated and described.

In testimony whereof, I have signed my name to this specification in the presence of two subscribing witnesses.

E. S. RICE.

Witnesses:
 E. P. HILL,
 MILAN RICHARDSON.